United States Patent
Ogasawara et al.

(10) Patent No.: US 9,800,333 B2
(45) Date of Patent: Oct. 24, 2017

(54) ELECTRONIC DEVICE, COMMUNICATION METHOD AND RECORDING MEDIUM

(71) Applicant: SEIKO INSTRUMENTS INC., Chiba-shi, Chiba (JP)

(72) Inventors: Kenji Ogasawara, Chiba (JP); Akira Takakura, Iwate-gun Iwate (JP); Kazumi Sakumoto, Chiba (JP); Tamotsu Maesawa, Chiba (JP); Kazuhiro Koyama, Chiba (JP); Tomohiro Ihashi, Chiba (JP); Kosuke Yamamoto, Chiba (JP); Ayumi Matsumoto, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 14/854,931

(22) Filed: Sep. 15, 2015

(65) Prior Publication Data
US 2016/0080078 A1    Mar. 17, 2016

(30) Foreign Application Priority Data

Sep. 16, 2014  (JP) ................................. 2014-188008

(51) Int. Cl.
*H04B 10/114* (2013.01)
*H04B 10/116* (2013.01)

(52) U.S. Cl.
CPC ......... *H04B 10/114* (2013.01); *H04B 10/116* (2013.01)

(58) Field of Classification Search
CPC .................................................. H04B 10/114

USPC ........................................................ 398/131
See application file for complete search history.

(56) References Cited

U.S. PATENT DOCUMENTS

| | | | |
|---|---|---|---|
| 2010/0299390 A1* | 11/2010 | Alameh | G06F 3/017 709/204 |
| 2014/0073252 A1* | 3/2014 | Lee | H04W 4/008 455/41.2 |
| 2014/0282728 A1* | 9/2014 | Matsunaga | G06F 3/0488 725/38 |
| 2014/0287686 A1* | 9/2014 | Kobayashi | H04W 4/008 455/41.2 |

OTHER PUBLICATIONS

Tobias Hesselmann, FlashLight: Optical Communication between Mobile Phones and Interactive Tabletops, ITS'10, Nov. 7-10, 2010, pp. 1-4.*
Tobias, FlashLight: Optical Communication between Mobile Phones and Interactive Tabletops—ITS'10, Nov. 7-10, 2010, pp. 1-4.*
Abstract, Publication No. 2001-099964, Publication Date Apr. 13, 2001.

* cited by examiner

*Primary Examiner* — David Payne
*Assistant Examiner* — Omar S Ismail
(74) *Attorney, Agent, or Firm* — Adams & Wilks

(57) ABSTRACT

An electronic device includes a display part having a light source which transmits an optical signal, a direction detection part for detecting a direction of orientation of a display screen of the display part, and a controller for transmitting data by the optical signal from the display part to an electronic timepiece when the direction of orientation of the display screen detected by the detection part faces a predetermined direction.

18 Claims, 4 Drawing Sheets

S101···TRANSMISSION BUTTON HAS BEEN PRESSED?
S102···TERMINAL HAS BEEN TURNED OVER?
S103···PREDETERMINED PERIOD HAS PASSED?
S104···TANSMIT DATA

ELECTRONIC DEVICE, COMMUNICATION METHOD AND RECORDING MEDIUM

BACKGROUND OF THE INVENTION

1. Field of the Invention

The present invention relates to an electronic device, a communication method and a recording medium.

2. Description of Related Art

There exists a system which performs data transmission by changing the brightness (color) of a display of an electronic device and receives the data by a solar panel of an electronic timepiece (for example, refer to JP-A-2001-99964 (Patent Document 1)). In such system, it is necessary to perform communication by turning over the electronic device for positioning so that the display of the electronic device faces the solar panel of the electronic timepiece.

However, in the technique described in Patent Document 1, there is a problem that it is difficult to perform communication normally as there is a case where the timing of outputting an optical signal does not match the timing of performing positioning between the display and the solar panel. For example, it is difficult for the electronic timepiece to normally receive data when the optical signal is outputted from the electronic device before performing positioning between the display and the solar panel.

SUMMARY OF THE INVENTION

The present invention has been made in view of the above problems and an object thereof is to provide a communication system, an electronic device, a communication method and a program capable of performing stable communication in the communication by using the optical signal.

According to an embodiment of the present invention, there is provided an electronic device including a display part having a light source which transmits an optical signal, a detection part detecting a direction of a display screen of the display part, and a controller transmitting data by the optical signal from the display part to another electronic device when the direction of the display screen detected by the detection part becomes a predetermined direction.

In the electronic device according to the embodiment of the present invention, the controller may transmit the data after a predetermined period of time passes from when the display screen faces the predetermined direction.

In the electronic device according to the embodiment of the present invention, the predetermined direction may be approximately a gravity direction.

According to the embodiment of the present invention, there is provided a communication method in an electronic device, which includes the steps of detecting a direction of a display screen of a display part having a light source which transmits an optical signal by the electronic device and performing control to transmit data by the optical signal from the display part by the electronic device when the direction of the display screen detected in the detection step becomes a predetermined direction.

Also according to the embodiment of the present invention, there is provided a program which allows a computer to execute the steps of detecting a direction of a display screen of a display part having a light source which transmits an optical signal and performing control to transmit data by the optical signal from the display part when the direction of the display screen detected in the detection step becomes a predetermined direction.

In the present invention, the electronic device includes the display part, the detection part and the controller. The display part has the light source which transmits an optical signal. The detection part detects a direction of orientation of the display screen of the display part. The controller transmits data by the optical signal from the display part to another electronic device when the direction of orientation of the display screen of the display part detected by the detection part becomes a predetermined direction. Accordingly, data can be transmitted after the positioning between the display screen of the display part which transmits the optical signal and another electronic device is performed: Accordingly, stable communication can be performed in the communication by the optical signal.

DETAILED DESCRIPTION OF EMBODIMENT

Figure 1:
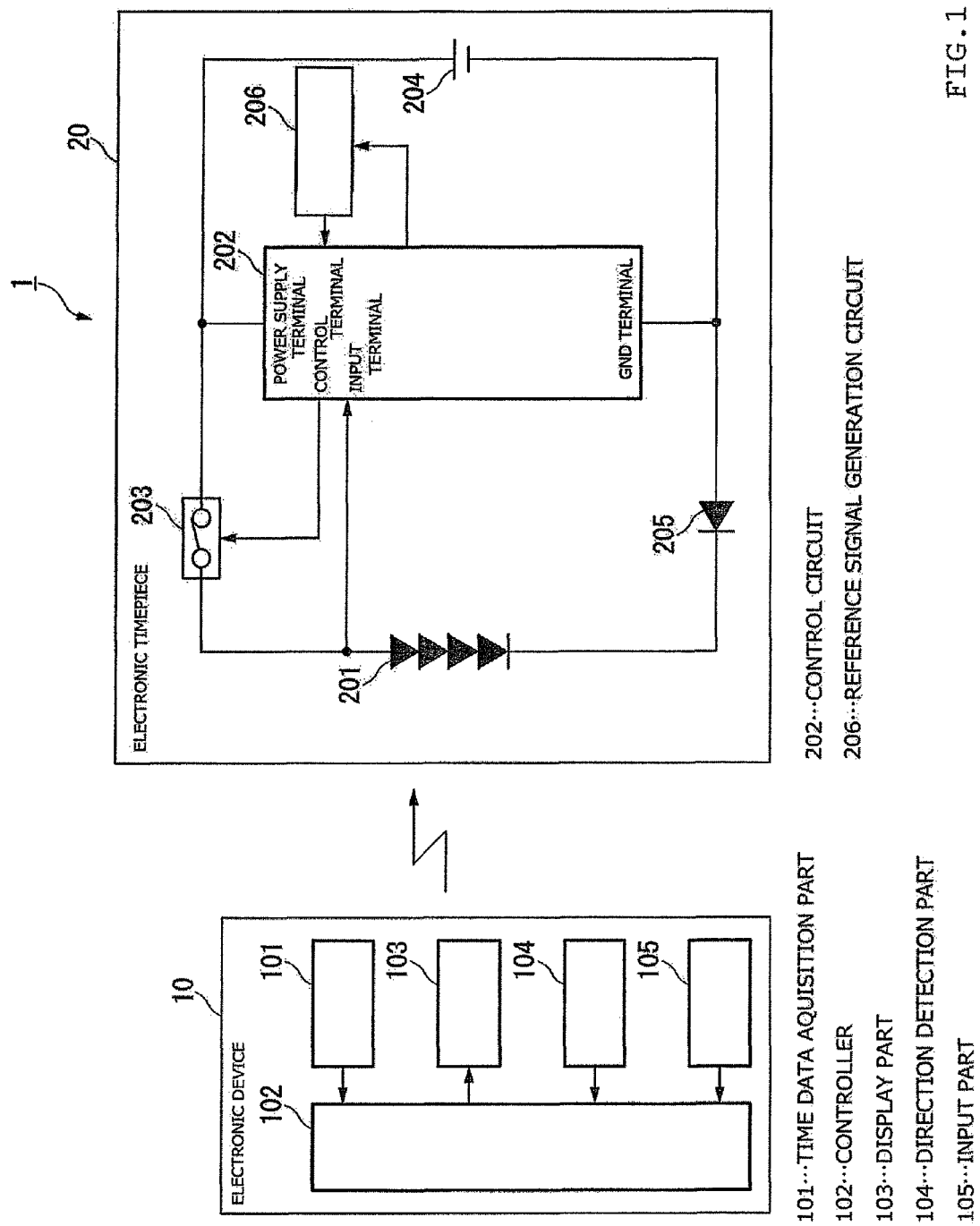
FIG. 1 is a schematic view showing a configuration of a communication system according to an embodiment of the present invention.

Hereinafter, an embodiment of the present invention will be explained with reference to the drawings. FIG. 1 is a schematic view showing a configuration of a communication system 1 according to the embodiment. In the shown example, the communication system 1 includes an electronic device 10 and an electronic timepiece 20. The electronic device 10 is an electronic device such as a smartphone, a cellular phone device or a tablet terminal, which may be a portable device which can be carried and arbitrarily operated by a user. In the shown example, the electronic device 10 includes a time data acquisition part 101, a controller 102, a display part 103, a direction detection part 104 and an input part 105.

The time data acquisition part 101 acquires the current date and time (the current time (hour, minute, second) and the current date (year, month, day)). For example, the time data acquisition part 101 uses a method of acquiring the current date and time by having access to a time server on the Internet, a method of acquiring the current date and time by using GPS (Global Positioning System) and a method of acquiring the current date and time from a control signal from a base station. Any method can be applied as the method of acquiring the current date and time.

The controller 102 performs control of respective parts included in the electronic device 10. The controller 102 generates time data for correcting the time of the electronic timepiece 20 based on the current date and time acquired by the time data acquisition part 101. Then, the controller 102 outputs (transmits) the generated time data which is transmission data by using the display part 103 as an optical signal.

The controller 102 displays a transmission button on the display part 103 when transmitting the transmission data by using the display part 103. Then, the controller 102 transmits transmission data when the input part 105 receives an operation input of pressing down the transmission button. The controller 102 also transmits transmission data from the display part 103 to the electronic timepiece 20 after a predetermined period of time passes from when the direction of a display screen of the display part 103 detected by the direction detection part 104 becomes a predetermined direction. The predetermined direction is approximately a gravity direction.

The display part 103 is a liquid crystal display or an organic EL (Electro-luminescence) display. A backlight (light source) of the display part 103 operates as a transmission part transmitting an optical signal to the electronic timepiece 20.

The direction detection part 104 includes an acceleration sensor capable of detecting an acceleration component of triaxial directions orthogonal to one another, detecting the direction of the display screen of the display part 103. The input part 105 is a touch panel installed on the display screen of the display part 103, receiving the input.

The electronic timepiece 20 is a timepiece which displays time in analog display. In the shown example, the electronic timepiece 20 includes a solar battery 201, a control circuit 202, a switch 203, a secondary battery 204, a diode 205 and a reference signal generation circuit 206.

The solar battery 201 operates as a power generation part which converts received light (sun, illumination and the like) into electric energy in a charging period. The solar battery 201 also performs optical communication with the electronic device 10 and operates as a receiving part which receives an optical signal from the electronic device 10 in a communication period. The charging period and the communication period will be described later.

The control circuit 202 also performs control of respective parts included in the electronic timepiece 20. The control circuit 202 performs charging control to the secondary battery 204 by the solar battery 201. The control circuit 202 also performs control to prevent overcharge of the secondary battery 204. The control circuit 202 further performs optical communication by using the solar battery 201. For example, the control circuit 202 is operated by the power outputted by the secondary battery 204 connected to a power supply terminal and a GND terminal. At this time, the control circuit 202 detects an output voltage of the secondary battery 204 to determine a charging state (full charge, overcharge and the like) of the secondary battery 204 and to control predetermined charge control. For example, the control circuit 202 performs ON/OFF control of the switch 203 by a control signal outputted from a control terminal in accordance with the charging state of the secondary battery 204. Accordingly, the control circuit 202 connects the solar battery 201 to the secondary battery 204 to charge the secondary battery 204. The control circuit 202 also prevents overcharge to the secondary battery 204 by cutting the connection between the solar battery 201 and the secondary battery 204.

The control circuit 202 also outputs a switch control signal based on a reference signal outputted by the reference signal generation circuit 206 to perform ON/OFF control of the switch 203. Accordingly, the control circuit 202 performs connection between the solar battery 201 and the secondary battery 204 as well as performs separation between the solar battery 201 and the secondary battery 204.

The control circuit 202 further detects an output voltage of the solar battery 201 inputted to an input terminal in the communication period and converts the detected voltage into an electric signal to receive transmission data transmitted from an external device (the electronic device 10 in the embodiment) by the optical communication. Then, the control circuit 202 corrects time indicated by a pointer based on time data as the transmission data.

The switch 203 performs connection between the solar battery 201 and the secondary battery 204 as well as performs separation between the solar battery 201 and the secondary battery 204 based on the switch control signal inputted from the control circuit 202. The secondary battery 204 supplies the power to respective parts included in the electronic timepiece 20. The diode 205 prevents reverse flow of electric current with respect to the secondary battery 204. The reference signal generation circuit 206 includes an oscillator circuit (for example, 32 kHz) and a divider circuit, which generates a reference signal of, for example, 1 Hz.

Next, a communication method between the electronic device 10 and the electronic timepiece 20 will be explained. In the embodiment, the electronic device 10 transmits data by using the display part 103. For example, the electronic device 10 causes the display part 103 to emit light when transmitting "1" and causes the display part 103 to turn off the light when transmitting "0". The electronic timepiece 20 receives data by using the solar battery 201. For example, the control circuit 202 of the electronic timepiece 20 determines the reception of "1" when the solar battery 201 receives light and generates a voltage, and determine the reception of "0" when the solar battery 201 does not generate a voltage.

When the solar battery 201 and the secondary battery 204 are connected, it is difficult to accurately determine the voltage generated by the solar battery 201 due to the output voltage of the secondary battery 204. Accordingly, in the embodiment, the switch 203 is controlled to separate the solar battery 201 and the secondary battery 204 at the time of receiving data for detecting the voltage generated by the solar battery 201 accurately. A period in which the solar battery 201 and the secondary battery 204 are separated is referred to as the "communication period".

In a period other than the communication period, the switch 203 is controlled to connect the solar battery 201 and the secondary battery 204. A period in which the solar battery 201 and the secondary battery 204 are connected is referred to as the "charging period". Accordingly, it is possible to receive data more accurately in the communication period.

It is also possible to perform setting so that the secondary battery 204 is not charged during the communication period. Accordingly, it is preferable that the communication period is short. Therefore, the charging period is set at a normal time and short communication periods are periodically set in the electronic device 20. Then, the electronic timepiece 20 continues to be in the communication period until receiving a transmission data signal when receiving a communication start signal from the electronic device 10 during the short communication period. On the other hand, the electronic timepiece 20 becomes in the charging period in the case where the transmission start signal is not received from the electronic device 10 during the communication period.

Figure 2:
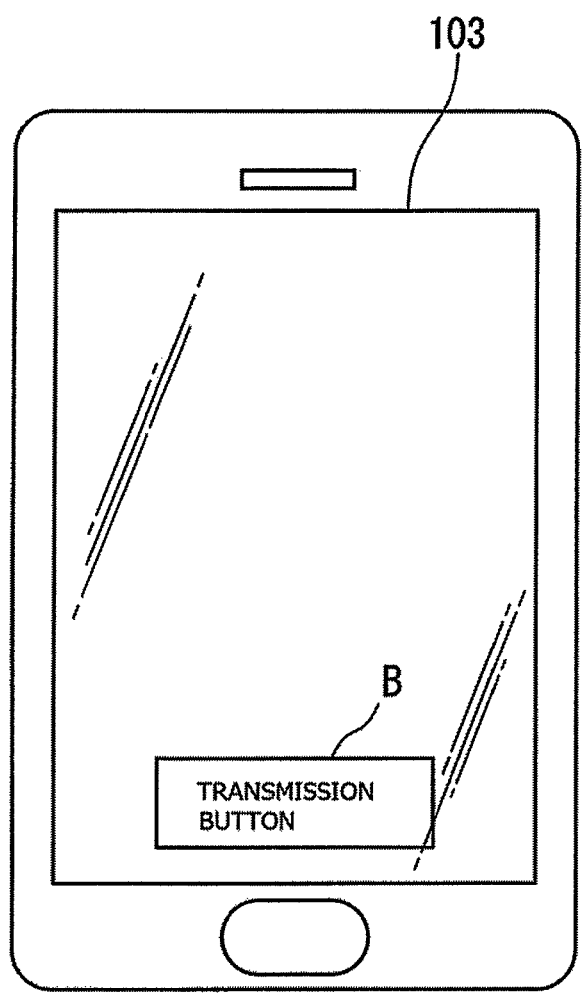
FIG. 2 is a schematic view showing an example of a display state which is displayed by a display part of an electronic device according to the embodiment of the present invention.

Next, a transmission timing of transmission data in the electronic device 10 will be explained with reference to FIG. 2, FIGS. 3A and 3B. FIG. 2 is a schematic view showing an example of a display state which is displayed by the display part 103 of the electronic device 10 according to the embodiment. The controller 102 displays a transmission button B on the display part 103 when transmitting the transmission data by using the display part 103. Then, the controller 102 outputs the transmission data as an optical signal from the display part 103 when the input part 105 receives an operation input of pressing down the transmission button B. The operation is performed in a first transmission part of the controller 102.

Figure 3A:
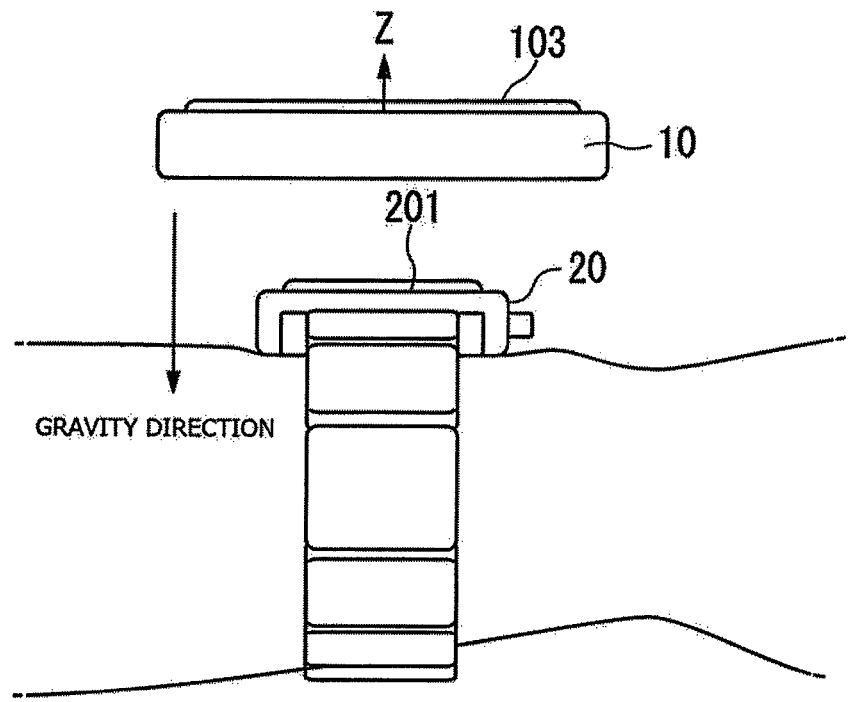
FIGS. 3A and 3B are views for explaining an example of the transmission timing in the electronic device according to the embodiment of the present invention.
Figure 3B:
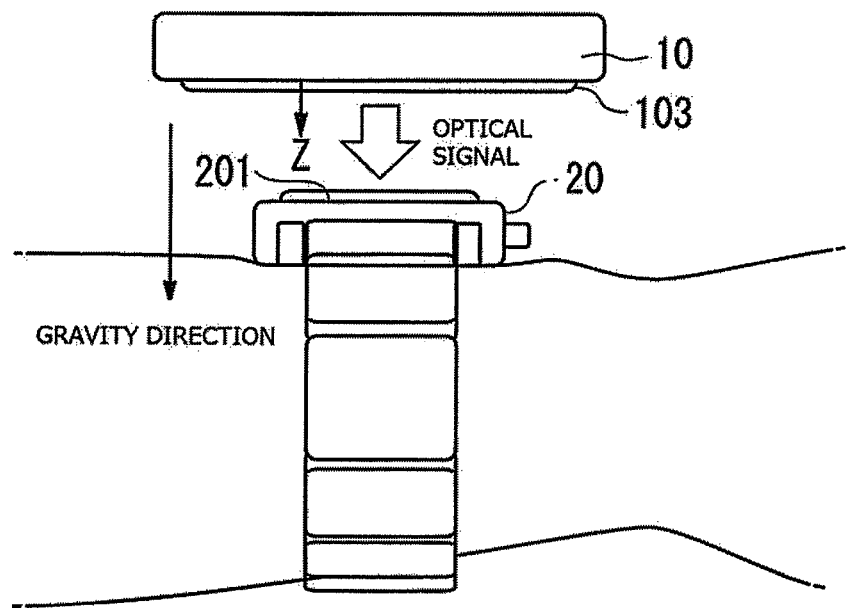

FIGS. 3A and 3B are views for explaining an example of the transmission timing in the electronic device 10 according to the embodiment. In the communication by the optical signal, it is difficult to perform communication stably between the electronic device 10 and the electronic timepiece 20 unless the display screen of the display part 103 of the electronic device 10 faces the solar battery 201 of the electronic timepiece 20. Accordingly, it is necessary that the user turns over the electronic device 10 in a state shown in FIG. 3A and allows the display screen of the display part 103 to face the solar battery 201 of the electronic timepiece 20 as in the state shown in FIG. 3B. As the transmission button B is displayed on the display part 103, the transmission button B is arranged on the reverse side for the user when the electronic device 10 is turned over. Accordingly, the user has difficulty in pressing down the transmission button B when the electronic device 10 is turned over for allowing the display screen of the display part 103 to face the solar battery 201.

Accordingly, in the case where the electronic device 10 is turned over in addition to the case where the transmission button B is pressed down, the controller 102 outputs transmission data from the display part 103 as an optical signal after predetermined period of time passes from when the electronic device 10 is turned over. The operation is performed in a second transmission part of the controller 102. Specifically, the controller 102 determines that the electronic device 10 has been turned over when a direction Z of the display screen of the display part 103 detected by the direction detection part 104 becomes approximately the gravity direction. The method of determining that the electronic device 10 has been turned over is not limited to the above method and any method can be applied. For example, it is also preferable that the controller 102 determines that the electronic device 10 has been turned over when the direction Z of the display screen of the display part 103 detected by the direction detection part 104 is changed by approximately 180 degrees. The state where the controller 102 determines the turning-over when the direction is approximately the gravity direction may be the following state. That is, an arm and so on as part of the user's body to which the electronic timepiece 20 is attached is normally positioned below a visual range of the user in the vertical direction. Moreover, the user normally watches the display screen of the electronic device 10 in a state where the display screen faces upward in the vertical direction. The display screen facing upward in the vertical direction is allowed to face downward in the vertical direction from the above state so as to face the arm and the like to which the electronic timepiece 20 is attached for performing the data transmission, thereby starting the optical communication.

It takes time from when the user turns over the electronic device 10 until the user completes positioning between the display screen of the display part 103 and the solar battery 201. Accordingly, the controller 102 outputs the transmission data from the display part 103 as an optical signal after a predetermined period of time passes from when the electronic device 10 is turned over in consideration of the time required for the positioning. Accordingly, the electronic device 10 can transmit transmission data after the positioning between the display screen of the display part 103 and the solar battery 201 is completed. Therefore, it is possible to perform stable communication.

Figure 4:
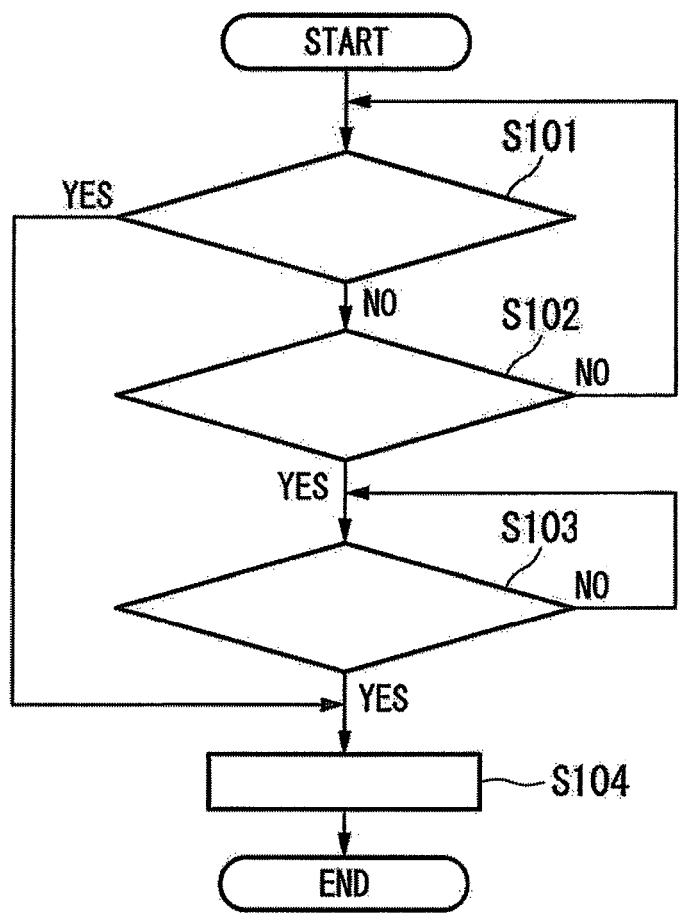
FIG. 4 is a flowchart showing a processing procedure of communication processing executed by the electronic device according to the embodiment of the present invention.

Next, a communication method in the communication system 1 will be explained with reference to FIG. 4. FIG. 4 is a flowchart showing a processing procedure of communication processing executed by the electronic device 10 according to the embodiment. The processing shown in the drawing is executed when the transmission data is transmitted.

(Step S101) The controller 102 displays the transmission button B on the display part 103 and determines whether the input part 105 has received an operation input of pressing down the transmission button B or not. When the controller 102 determines that the input part 105 determines that the operation input of pressing down the transmission button B, the process proceeds to Step S104. When the controller 102 determines that the controller 102 determines that the operation input of pressing down the transmission button B has not been received, the process proceeds to Step S102.

(Step S102) The controller 102 determines whether the electronic device 10 has been turned over or not. When the controller 102 determines that the electronic device 10 has been turned over, the process proceeds to Step S103. When the controller 102 determines that the electronic device 10 has not been turned over, the process returns to Step S101.

(Step S103) The controller 102 determines whether a predetermined period of time has passed from when the electronic device 10 was turned over or not. When the controller 102 determines that a predetermined period of time has passed, the process proceeds to Step S104. When the controller 102 determines that the predetermined period of time has not passed, the process of Step S103 is executed again.

(Step S104) The controller 102 controls the display part 103 to transmit the transmission data. After that, the processing ends.

As described above, the controller 102 of the electronic device 10 transmits the transmission data after a predetermined period of time passes from when the display screen of the display part 103 faces a predetermined direction. Accordingly, the electronic device 10 can transmit the transmission data after the positioning between the display part 103 of the electronic device 10 and the solar battery 201 of the electronic timepiece 20 is completed. Moreover, it is difficult for the user to specify the position of the transmission button B and press down the transmission button B as the transmission button B is positioned in the reverse side for the user in the state where the electronic device 10 is turned over for transmitting data. In the embodiment, the controller 102 of the electronic device 10 transmits the transmission data when the display screen of the display part 103 faces the given direction even in the case where the operation input of pressing down the transmission button B is not received. Therefore, it is possible to perform stable communication by a simple operation.

The entire or part of the functions of respective parts included in the electronic device 10 or the electronic timepiece 20 in the above embodiment may be realized by recording a program for executing these functions in a computer-readable recording medium and reading the program recorded in the recording medium in a computer system to be executed. Note that the "computer system" in this case includes hardware such as OS and peripheral devices.

The "computer-readable recording medium" indicates a portable medium such as a flexible disc, a magneto-optical disc, a ROM or a CD-ROM, or a storage unit such as hard disk built in the computer system. The "computer-readable recording medium" may also include a medium dynamically holding the program for a short time such as a communication cable used when transmitting the program through a network such as Internet or through a communication line such as a telephone line as well as a medium temporarily holding the program such as a volatile memory inside the computer system to be a server or a client in the above case. The above program may be also for realizing part of the above functions and may be realized by combining the above functions with a program already recorded in the computer system.

The embodiment of the present invention has been explained as described above. However, the present invention is not limited to the above embodiment and various alterations may occur within a scope not departing from the gist of the present invention.

For example, the electronic timepiece 20 repeats the charging period and the communication period in which the optical communication is performed in a given cycle in the embodiment, however, the present invention is not limited to this, and it is also preferable that the charging period and the communication period are switched by controlling the switch 203 in accordance with the charging state of the secondary battery 204.

Also in the above embodiment, the direction detection part 104 which detects the direction of the display screen of the display part 103 is the acceleration sensor, however, the present invention is not limited to this, and devices which can detect the direction of the display screen such as an illuminance sensor may be applied. For example, the controller 102 determines that the electronic device 10 has been turned over when the illuminance is a predetermined value or less when the direction detection part 104 is the illuminance sensor. In this case, the controller includes the first transmission part transmitting an optical signal when the transmission button is operated and the second transmission part determining that the direction of the display screen becomes a predetermined direction and transmitting an optical signal when it is determined that the illuminance detected by the illuminance sensor is the predetermined value or less. The direction detection part 104 may also be, for example, a noncontact thermometer such as a pyroelectric sensor which detects the external body temperature of the user to which the electronic timepiece 20 is attached. In this case, data is transmitted as an optical signal when the noncontact thermometer detects the external human body temperature. In this case, the controller includes a first transmission part transmitting the optical signal when the transmission button is operated and a second transmission part determining that the direction of the display screen becomes a given direction and transmitting the optical signal when it is determined that the temperature detected by the thermometer is in the vicinity of the external body temperature of the user wearing the electronic timepiece 20.

Although the controller 102 determines that the positioning between the display part 103 and the solar battery 201 is completed when the electronic device 10 is turned over in the above embodiment, the present invention is not limited to this, and it is also preferable that the positioning between the display part 103 and the solar battery 201 is completed, for example, when the electronic device 10 makes a predetermined angle.

Furthermore, the transmission button B is displayed on the display part 103 and whether the input part 105 has received the operation input of pressing down the transmission button B or not is determined in Step S101 in the above embodiment, however, the present invention is not limited to this. It is also preferable that the transmission button B is not displayed on the display part 103 and that the step S101 is omitted.

Although the electronic timepiece 20 receives the optical signal by the solar battery 201 in the above embodiment, the receiving part which receives the optical signal is not limited to this, and devices which can detect brightness such as the luminance sensor can be applied.

When the electronic device 10 is a portable device which can be easily carried by the user and the electronic timepiece 20 is a watch which can be worn by the same user which carries the electronic device 10 in the above embodiment, the watch can obtain data from the portable device also in the case where the user is in a space separated from the outside, therefore, communication environment with good user friendliness can be obtained regardless of use environment.

FIG. 1
10 ELECTRONIC DEVICE
101 TIME DATA ACQUISITION PART
102 CONTROLLER
103 DISPLAY PART
104 DIRECTION DETECTION PART
105 INPUT PART
20 ELECTRONIC TIMEPIECE
202 CONTROL CIRCUIT
CONTROL TERMINAL
POWER SUPPLY TERMINAL
INPUT TERMINAL
GND TERMINAL
206 REFERENCE SIGNAL GENERATION CIRCUIT
FIG. 2
TRANSMISSION BUTTON
FIG. 3A
GRAVITY DIRECTION
FIG. 3B
OPTICAL SIGNAL
GRAVITY DIRECTION
FIG. 4
S101 TRANSMISSION BUTTON HAS BEEN PRESSED?
S102 TERMINAL HAS BEEN TURNED OVER?
S103 PREDETERMINED PERIOD HAS PASSED?
S104 TRANSMIT DATA

What is claimed is:

1. A portable electronic device comprising:
   a display part having a display screen and a light source which transmits an optical signal;
   a detection part configured to detect a direction of orientation of the display screen of the display part; and
   a controller configured to transmit data by the optical signal from the display part to another electronic device when the controller determines that the direction of orientation of the display screen detected by the detection part becomes a predetermined direction; and
   a transmission button provided in the display part side for initiating transmission of the optical signal including time data when operated,
   wherein the detection part comprises an acceleration sensor capable of detecting an acceleration component of triaxial directions orthogonal to one another, and
   wherein the controller includes a first transmission part for transmitting the optical signal when the transmission button is operated and a second transmission part for transmitting the optical signal when it is determined that the direction of the display screen becomes the predetermined direction by an output of the acceleration sensor.

2. A portable electronic device comprising:
a display part having a display screen and a light source which transmits an optical signal;
a detection part configured to detect a direction of orientation of the display screen of the display part; and
a controller configured to transmit data by the optical signal from the display part to another electronic device when the controller determines that the direction of orientation of the display screen detected by the detection part becomes a predetermined direction;
a transmission button provided in the display part side for initiating transmission if the optical signal including time data when operated,
wherein the detection part comprises an illuminance sensor for detecting the illuminance of light incident on the display screen, and
wherein the controller includes a first transmission part for transmitting the optical signal when the transmission button is operated and a second transmission part for determining that the direction of the display screen becomes the predetermined direction and transmitting the optical signal when it is determined that the illuminance detected by the illuminance sensor is a predetermined value or less.

3. A portable electronic device comprising:
a display part having a display screen and a light source which transmits an optical signal;
a detection part configured to detect a direction of orientation of the display screen of the display part; and
a controller configured to transmit data by the optical signal from the display part to another electronic device when the controller determines that the direction of orientation of the display screen detected by the detection part becomes a predetermined direction;
a transmission button provided in the display part side for initiating transmission of the optical signal including time data when operated,
wherein the detection part comprises a thermometer for detecting a temperature in front of the display screen, and
wherein the controller includes a first transmission part for transmitting the optical signal when the transmission button is operated and a second transmission part for determining that the direction of the display screen becomes the predetermined direction and for transmitting the optical signal when it is determined that the temperature detected by the thermometer is in the vicinity of the external body temperature of a user to which the other electronic device is attached.

4. The portable electronic device according to claim 3, wherein the other electronic device is a wrist-worn electronic device configured to be worn on a user's wrist.

5. The portable electronic device according to claim 3, wherein the other electronic device is a wristwatch.

6. The portable electronic device according to claim 3, wherein the other electronic device is a portable electronic device.

7. A portable electronic device that optically communicates with another electronic device, the portable electronic device comprising:
a display part having a display screen and a light source that transmits an optical signal using the display screen;
a detection part configured to detect the direction in which the display screen faces; and
a controller configured to determine when the direction of the display screen detected by the detection part faces a given direction and to thereafter transmit data by the optical signal from the display part to another electronic device, wherein
the display part includes a transmission button,
the detection part comprises an illuminance sensor that detects the illuminance of light incident on the display screen, and
wherein the controller includes a first transmission part for transmitting the optical signal when the transmission button is operated and a second transmission part for determining when the display screen faces the given direction and transmitting the optical signal when it is determined that the illuminance detected by the illuminance sensor is a given value or less.

8. A portable electronic device that optically communicates with another electronic device, the portable electronic device comprising:
a display part having a display screen and a light source that transmits an optical signal using the display screen;
a detection part configured to detect the direction in which the display screen faces; and
a controller configured to determine when the direction of the display screen detected by the detection part faces a given direction and to thereafter transmit data by the optical signal from the display part to another electronic device, wherein
the display part includes a transmission button,
the detection part comprises a thermometer that detects the temperature near the front of the display screen, and
wherein the controller includes a first transmission part for transmitting the optical signal when the transmission button is operated and a second transmission part for determining when the display screen faces the predetermined direction and for transmitting the optical signal when it is determined that the temperature detected by the thermometer is in the vicinity of the external body temperature of a user to which the other electronic device is attached.

9. The portable electronic device according claim 8, wherein the other electronic device is a wrist-worn electronic device configured to be worn on a user's wrist.

10. The portable electronic device according to claim 8, wherein the other electronic device is a portable electronic device.

11. The portable electronic device according to claim 7, wherein the other electronic device is a wrist-worn electronic device configured to be worn on a user's wrist.

12. The portable electronic device according to claim 7, wherein the other electronic device is a portable electronic device.

13. The portable electronic device according to claim 2, wherein the other electronic device is a wrist-worn electronic device configured to be worn on a user's wrist.

14. The portable electronic device according to claim 2, wherein the other electronic device is a wristwatch.

15. The portable electronic device according to claim 3, wherein the other electronic device is a portable electronic device.

16. The portable electronic device according to claim 1, wherein the other electronic device is a wrist-worn electronic device configured to be worn on a user's wrist.

17. The portable electronic device according to claim 1, wherein the other electronic device is a wristwatch.

18. The portable electronic device according to claim 1, wherein the other electronic device is a portable electronic device.

* * * * *